US010054704B2

(12) United States Patent
Bisley et al.

(10) Patent No.: US 10,054,704 B2
(45) Date of Patent: Aug. 21, 2018

(54) PREDICTING MULTIPLES IN SURVEY DATA

(71) Applicant: WESTERNGECO L.L.C., Houston, TX (US)

(72) Inventors: Richard Bisley, East Victoria Park (AU); Ian Moore, Queenstown (NZ)

(73) Assignee: WESTERNGECO L.L.C., Houston, TX (US)

( * ) Notice: Subject to any disclaimer, the term of this patent is extended or adjusted under 35 U.S.C. 154(b) by 1114 days.

(21) Appl. No.: 14/296,169

(22) Filed: Jun. 4, 2014

(65) Prior Publication Data

US 2015/0006085 A1  Jan. 1, 2015

Related U.S. Application Data

(60) Provisional application No. 61/841,764, filed on Jul. 1, 2013.

(51) Int. Cl.
*G01V 1/38* (2006.01)
*G01V 1/36* (2006.01)

(52) U.S. Cl.
CPC ............... *G01V 1/36* (2013.01); *G01V 1/38* (2013.01); *G01V 2210/56* (2013.01)

(58) Field of Classification Search
CPC ......... G01V 1/38; G01V 2210/56; G01V 1/36
USPC .......................................................... 367/24
See application file for complete search history.

(56) References Cited

U.S. PATENT DOCUMENTS

| 6,832,161 | B1 | 12/2004 | Moore |
| 7,489,590 | B2 * | 2/2009 | Grion .................... G01V 1/364 367/21 |
| 2008/0294346 | A1 | 11/2008 | Nemeth et al. |
| 2009/0245022 | A1 | 10/2009 | Dragoset, Jr. |
| 2010/0246324 | A1 | 9/2010 | Dragoset et al. |
| 2011/0317521 | A1 | 12/2011 | Dragoset et al. |
| 2012/0253758 | A1 | 10/2012 | Lazaratos et al. |

FOREIGN PATENT DOCUMENTS

| EP | 1735640 B1 | 12/2006 |
| EP | 1735640 | 12/2008 |
| WO | 2005103764 | 11/2005 |

OTHER PUBLICATIONS

Berryhill et al., "Deep-water peg legs and multiples: Emulation and suppression," Geophysics, Dec. 1986, vol. 51(12): pp. 2177-2184.
Jin et al., "Model-based Water-layer Demultiple (MWD) for shallow water: from streamer to OBS," SEG Las Vegas 2012 Annual Meeting, 2012: pp. 1-5.

(Continued)

*Primary Examiner* — Ian J Lobo
(74) *Attorney, Agent, or Firm* — Michael Guthrie (57) ABSTRACT

Data representing a first multiple is predicted, based on first survey data for a target structure, using a multidimensional model of a layer in which the first multiple occurs. Modified survey data is produced by performing a subtraction of the predicted data representing the first multiple from the first survey data. Based on the modified survey data, data representing a second multiple is predicted using the multidimensional model.

20 Claims, 7 Drawing Sheets

(56) References Cited

OTHER PUBLICATIONS

Lokshtanov, "G037: Suppression of Multiples from Complex Sea-Floor by a Wave-Equation Approach," EAGE 66th Conference & Exhibition, Jun. 2004: pp. 1-4.
Stork et al., "Predicting and removing complex 3D surface multiples with WEM modeling—an alternative to 3D SRME for wide azimuth surveys?" SEG/New Orleans Annual Meeting, 2006: pp. 2679-2683.
Wiggins, "Attenuation of complex water-bottom multiples by wave-equation-based prediction and subtraction," Geophysics, Dec. 1988, vol. 53(12): pp. 1527-1539.
Berryhill, et al., "Deep-water peg legs and multiples: Emulation and suppression," Geophysics, 51(12), 1986, pp. 2177-2184.
International Search Report and Written Opinion for PCT/US2014/043654 dated Nov. 12, 2014.
Stork, et al., "Predicting and removing complex 3D surface multiples with WEM modeling—an alternative to 3D SRME for wide azimuth surveys?" SEG Technical Program Expanded Abstracts 2006: pp. 2679-2683.
Wiggins, "Attenuation of complex water-bottom multiples by wave-equation-based prediction and subtraction," Geophysics, 53(12), 1988, pp. 1527-1539.
Dragoset, et al, "A perspective on 3D surface-related multiple elimination," Geophysics, Society of Exploration Geophysicists, vol. 75, No. 5, Sep. 1, 2010, pp. 75A245-75A261.
Search Report for the equivalent European patent application 14819918.5 dated Jan. 12, 2017.
Communication pursuant to Article 94(3) for the equivalent European patent application 14819918.5 dated Jan. 27, 2017.
Examination Report for the equivalent Australian patent application 2014284621 dated Aug. 17, 2017.

\* cited by examiner

PREDICTING MULTIPLES IN SURVEY DATA

CROSS-REFERENCE TO RELATED APPLICATION

This application claims the benefit of U.S. Provisional Patent Application Ser. No. 61/841,764 filed Jul. 1, 2013, which is hereby incorporated herein by reference.

BACKGROUND

Seismic surveying is a method for determining the structure of subterranean formations in the earth. Seismic surveying can utilize seismic energy sources that generate seismic waves, and seismic receivers that are positioned to detect the seismic waves. The seismic waves propagate into the formations in the earth, where a portion of the waves reflects from interfaces between subterranean formations. The reflected seismic waves are detected by the seismic receivers, which convert the reflected waves into representative data. The data can be transmitted by electrical, optical, radio or other techniques to devices which record the data. Through analysis of the recorded data, the shape, position and composition of subterranean formations can be determined.

Land seismic surveying is a method for determining the structure of subterranean formations beneath the surface of the earth. Seismic sources and seismic receivers for land seismic surveying can be placed on the surface of the earth. In different examples, the seismic source(s) or seismic receiver(s), or both, may be placed in a borehole for vertical seismic profiling.

Marine seismic surveying is a method for determining the structure of subterranean formations underlying bodies of water. Marine seismic surveying can utilize seismic energy sources and seismic receivers located in the water and can be towed behind a vessel or positioned on the water bottom from a vessel. Marine seismic surveying can also employ seismic receivers deployed on a seabed cable (which is provided on a seabed).

In marine seismic surveying, seismic waves do not reflect just from the interfaces between subterranean formations. Seismic waves also reflect from the water bottom (e.g., seafloor) and the water surface (e.g., sea surface), and the resulting reflected waves themselves continue to reflect. Waves that reflect multiple times are called "multiples." Waves that reflect multiple times in the water layer between the water surface above and the water bottom below are called "water bottom multiples" or "water layer multiples." The presence of water layer multiples in recorded seismic data can reduce the accuracy of seismic processing and interpretation techniques.

SUMMARY

In some embodiments, data representing a first multiple is predicted, based on first survey data for a target structure, using a multidimensional model of a layer in which the first multiple occurs. Modified survey data is produced by performing a subtraction of the predicted data representing the first multiple from the first survey data. Based on the modified survey data, data representing a second multiple is predicted using the multidimensional model.

Other or additional features will become apparent from the following description, from the drawings, or from the claims.

BRIEF DESCRIPTION OF THE DRAWINGS

Some implementations are described with respect to the following figures.

DETAILED DESCRIPTION

Reference will now be made in detail to embodiments, examples of which are illustrated in the accompanying drawings and figures. In the following detailed description, numerous specific details are set forth in order to provide a thorough understanding of some embodiments. However, it will be apparent to one of ordinary skill in the art that the embodiments may be practiced without these specific details.

The terminology used in the description is for the purpose of describing example embodiments. As used in the description and the appended claims, the singular forms "a," "an" and "the" are intended to include the plural forms as well, unless the context clearly indicates otherwise. It will be further understood that the terms "includes," "including," "comprises" and/or "comprising," when used in this application, specify the presence of stated features, integers, tasks, operations, elements, and/or components, but do not preclude the presence or addition of one or more other features, integers, tasks, operations, elements, components, and/or groups thereof.

Although reference is made to subterranean structures or formations in the disclosure, it is contemplated that techniques or mechanisms according to some implementations can be applied to other types of target structures where data imaging and processing issues may occur, such as human tissue, mechanical structures, plant tissue, animal tissue, solid volumes, substantially solid volumes, volumes of liquid, volumes of gas, volumes of plasma, and volumes of space near and/or outside the atmosphere of a planet, asteroid, comet, moon, or other body, and so forth.

Figure 1:
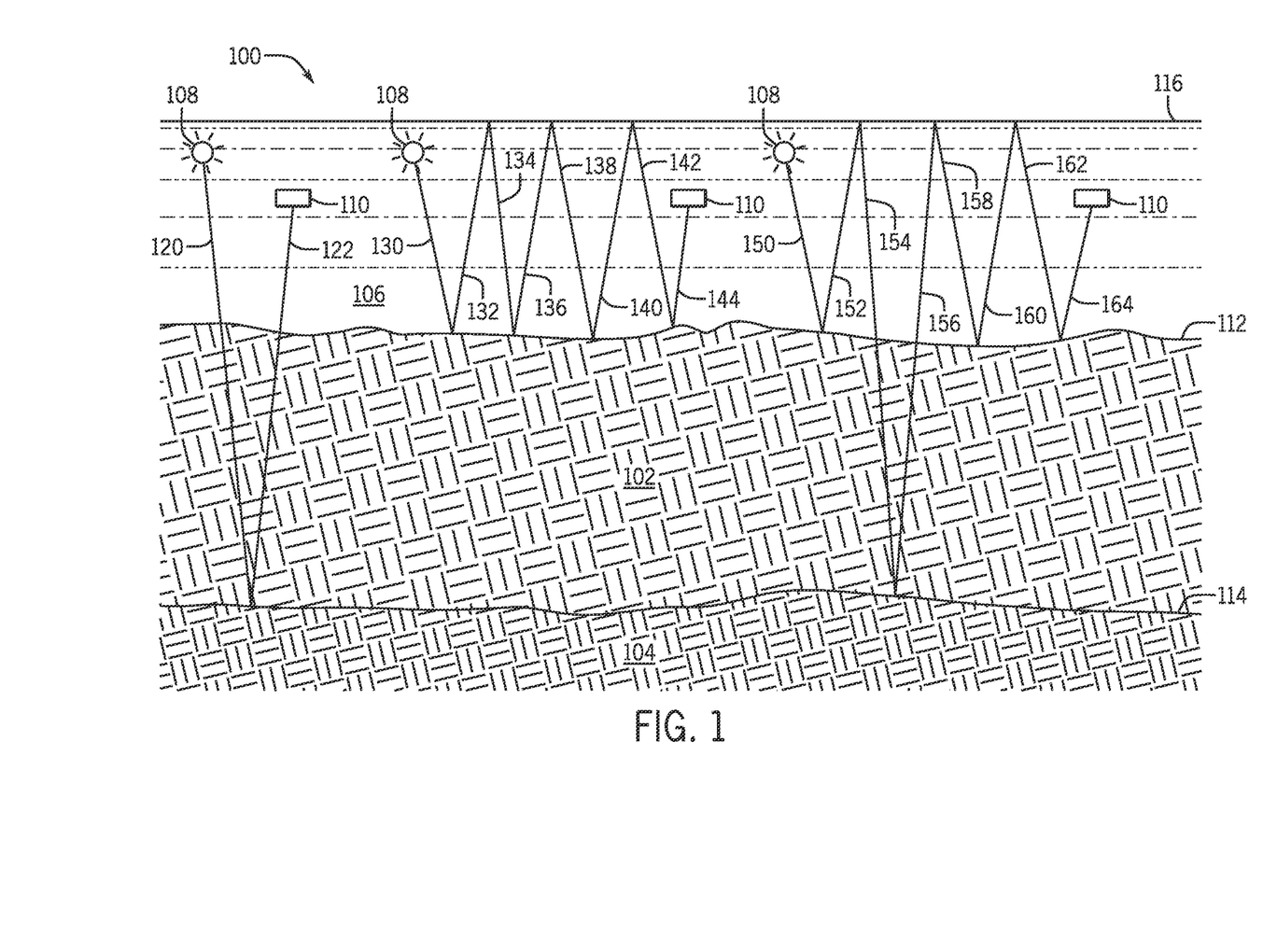
FIG. 1 is a schematic view of an example survey arrangement.

FIG. 1 shows a schematic view of marine seismic surveying example 100. Subterranean formations to be explored, such as 102 and 104, lie below a body of water 106. Seismic energy sources 108 and seismic receivers 110 are positioned in the body of water 106, by one or more marine vessels (not shown). In other examples, seismic receivers can be deployed on a seabed cable. A seismic source 108, such as an air gun, vibrator, or other type of source, creates seismic waves in the body of water 106 and a portion of the seismic waves travels downward through the body of water 106 toward the subterranean formations 102 and 104 beneath the body of water 106. When the seismic waves reach a seismic reflector, a portion of the seismic waves reflects upward and a portion of the seismic waves continues downward. The seismic reflector can be the water bottom 112 or one of the interfaces between subterranean formations, such as an interface 114 between formations 102 and 104. When the reflected waves traveling upward reach the water/air interface at the water surface 116, a majority portion of the waves reflects downward. Continuing in this fashion, seismic waves can reflect multiple times between the water bottom 112 or formation interfaces below and the water surface 116 above. Each time the reflected waves propagate past the position of a seismic receiver 110, the receiver 110 senses the reflected waves and generates representative signals.

In other examples, the sources 108 can be referred to as survey sources that produce energy for propagation into a target structure, and the receivers 110 are referred to as survey receivers to measure signals representing the propagated energy affected by the target structure. In the ensuing discussion, reference is made to seismic data collected by seismic receivers. More generally, survey receivers can acquire survey data, which can include seismic wavefields, acoustic signals, or other signals.

Primary reflections are those seismic waves that have reflected just once, from the water bottom 112 or an interface between subterranean formations, before being detected by a seismic receiver 110. Primary reflections contain the desired information about the subterranean formations which marine seismic surveying seeks. An example of a primary reflection is shown in FIG. 1 by ray paths 120 and 122. Seismic waves are generated by a seismic source 108 and a portion of the waves travels downward through the body of water 106 and into the subterranean formation 102 along ray path 120. A portion of the seismic waves reflects from the interface 114 between formations 102 and 104. The reflected waves travel upward through the formation 102 and back into the body of water 106 along ray path 122. The reflected waves travel past a receiver 110, which detects the waves and generates a representative signal.

Water layer multiples are those waves that have reflected multiple times between the water surface 116 and the water bottom 112 before being sensed by a receiver 110. An example of a water layer multiple is shown starting at ray path 130. Seismic waves are generated by a seismic source 108 and a portion of the waves travels downward through the body of water 106 along ray path 130. A portion of the seismic waves reflects from the water bottom 112 and travels back upward through the body of water 106 along ray path 132. A portion of the reflected waves reflects from the water surface 116 and travels back downward through the body of water 106 along ray path 134. A portion of the twice-reflected waves reflects again from the water bottom 112 and travels back upward through the body of water 106 along ray path 136. A portion of the thrice-reflected waves reflects again from the water surface 116 and travels back downward through the body of water 106 along ray path 138. A portion of the four times reflected waves reflects again from the water bottom 112 and travels back upward through the body of water 106 along ray path 140. A portion of the five times reflected waves reflects again from the water surface 116 and travels back downward through the body of water 106 along ray path 142. A portion of the six times reflected waves reflects again from the water bottom 112 and travels back upward through the body of water 106 along ray path 144. The seven times reflected waves then travel past a receiver 110, which detects the waves and generates a representative signal. The water layer multiple starting at ray path 130 is a simple water layer multiple since the seismic waves would not go below the water bottom 112, i.e., they remain within the water layer or body of water 106. The water layer multiple starting at ray path 130 is a multiple of order three, since the multiple contains three reflections from the water surface 116.

A water layer multiple that goes below the water bottom 112 can be referred to as a peg-leg water layer multiple. FIG. 1 illustrates an example of a peg-leg water layer multiple starting at ray path 150. Seismic waves are generated by a seismic source 108 and a portion of the waves travels downward through the body of water 106 and into the subterranean formation 102 along ray path 150. A portion of the seismic waves reflects from the water bottom 112 and travels back upward through the body of water 106 along ray path 152. A portion of the reflected waves reflects from the water surface 116 and travels back downward through the body of water 106 and into the subterranean formation 102 along ray path 154. A portion of the twice-reflected waves reflects from the interface 114 and travels back upward through the formation 102 and the body of water 106 along ray path 156. A portion of the thrice-reflected waves reflects again from the water surface 116 and travels back downward through the body of water 106 along ray path 158. A portion of the four times reflected waves reflects again from the water bottom 112 and travels back upward through the body of water 106 along ray path 160. A portion of the five times reflected waves reflects again from the water surface 116 and travels back downward through the body of water 106 along ray path 162. A portion of the six times reflected waves reflects again from the water bottom 112 and travels back upward through the body of water 106 along ray path 164. The seven times reflected waves then travel past a receiver 110, which detects the waves and generates a representative signal. The peg-leg water layer multiple starting at ray path 150 is a multiple of order three, since the multiple contains three reflections from the water surface 116.

One of the three reflections (to the left of the peg-leg water layer multiple) from the water surface 116 is located on the source 108 side (referred to as a "source-side multiple"), while the other two (to the right of the peg-leg water layer multiple) are located on the receiver 110 side (referred to as a "receiver-side multiple").

Water layer multiples may have one or more downward reflection points at the water surface. Downwardly reflected water layer multiples can in turn be reflected upwardly at the water bottom, forming one or more round-trips through the water-layer. These round-trips may be between the receiver and the rest of the ray path, or the between the source and the rest of the ray path, or between both. Response modes that have a receiver-side round-trip (of multiples) can be predicted by wavefield extrapolation of a shot record (a record of seismic data measured by survey receivers) through a round-trip of the water layer. Note this includes multiples that have round-trips on both source and receiver sides, as well as simple water bottom multiples (a simple water bottom multiple is a multiple that does not involve a reflection from a subsurface reflector). Wavefield extrapolation can refer to estimating unknown wavefield values based on known wavefield values, such as by using a model (e.g., model of a water layer, model of a subterranean structure, etc.) through which multiples are propagated.

Response modes that have a source-side round-trip (of multiples) can be predicted by wavefield extrapolation of a common receiver gather through a round trip of the water layer. A common receiver gather includes seismic data measured by a survey receiver in response to multiple shots (multiple activations of one or multiple survey sources).

Multiples can be predicted, and the predicted multiples can be used to process recorded seismic data (such as by use of adaptive-match filtering and subtraction) to reduce the effect of multiples on processing and interpretation of recorded seismic data. In some examples, a desirable characteristic of a process that provides predicted multiples is that there is internal relative amplitude consistency of plural modes (e.g., a response mode that has a receiver-side round-trip of multiples, and a response mode that has a source-side round-trip of multiples) in the predicted multiples and the recorded seismic data. The internal relative amplitude consistency can reduce the likelihood of adaptive-match filtering and subtraction resulting in either or both over- and under-subtraction of different modes.

Wavefield extrapolation of recorded survey data through a model of the water layer can be used for creating water-layer-multiple model traces. A trace can refer to survey data acquired or predicted for a target structure in response to energy from one or more survey sources. A water-layer-multiple model trace can refer to a trace including predicted multiples that uses a model of a water layer. Note that a source-side, or receiver-side, extrapolation alone may not predict some water-layer modes. However since some modes have both source and receiver sides, creating both source and receiver side multiple predictions from the unchanged recorded survey data can result in duplication of these modes and the two resulting models cannot, in general, be consistently match-filtered and subtracted from the data. It may be feasible to predict and subtract the two sides sequentially (the second pass excludes the first order simple water bottom multiple). However, source and receiver side multiple can be kinematically similar and a two-pass approach may result in match-filtering of the first-side model traces subtracting some of the modes associated with the second-side, thus resulting in amplitude inconsistency that hampers the match-filtering of the second-side model trace.

In some examples, a water-layer demultiple (DWD) technique uses a one-dimensional (1D) earth assumption to predict first-side (source side or receiver side) multiples by wavefield extrapolation through the water-layer model. The first-side multiples are then attenuated with a constrained match-filter and subtraction that reduces subtraction of the second-side mode, to provide a temporary dataset which then is used for the second-side (receiver side or source side) multiple prediction. The match filter is constrained by a short length (to a few samples, for example) and maximum allowable coefficient amplitude (to prevent a coefficient of the match filter from exceeding a specified value). An estimate of the water bottom reflectivity is derived before the DWD processing and incorporated in the water-layer model so that amplitude errors of the prediction are within small bounds.

The unfiltered multiple prediction model traces from both sides (source side and receiver side) are then added together prior to subsequent adaptive match-filtering and subtraction from the data. A 1D DWD technique that uses a 1D earth assumption can allow the source and receiver side wavefield extrapolation to take place in the same domain, and the same convolutional wavefield extrapolation operator (e.g., a p-dependant tau shift in tau-p domain, where tau refers to time and p refers to slowness) can be reused for both the source and receiver sides. This simplification means that the prediction is gather by gather and relatively efficient. Errors resulting from this assumption can be handled by subsequent adaptive match filtering. However, errors resulting from strong changes in bathymetry or strong structural complexity in the subsurface may not be resolvable by match-filtering and so there are circumstances where improved accuracy is desirable.

In accordance with some implementations, a general DWD technique can be used that employs a multidimensional (e.g., 2D, 3D, 4D, etc.) model of the water layer, subsurface (or other target structure), or other structure(s) through which multiples can propagate. With the general DWD technique, source and receiver side wavefield extrapolations cannot be performed in the same domain (unlike the 1D DWD techniques described above), because the wavefield extrapolation operators may differ between the source and receiver sides. In some examples, receiver-side extrapolation can be done on 3D (areal) shot gathers (a shot gather can refer to survey data collected by survey receivers for a particular shot), and source-side extrapolation can be done on 3D (areal) receiver gathers (a receiver gather can refer to survey data collected by a particular receiver in response to shots).

Although the description refers to applying general DWD techniques to remove or attenuate multiples in surveys of subterranean structures, it is noted that the general DWD techniques can also be applied in other surveying contexts, such as in a survey of another type of target structure where multiples may occur in a layer in the proximity of the target structure. Also, although the ensuing discussion refers to general DWD techniques applied in 3D space, it is noted that in other examples, general DWD techniques can be applied in other multidimensional spaces.

An actual recording geometry may not result in well sampled 3D gathers (particularly receiver gathers). As a result, the actual recording geometry is constructed from the available survey data (e.g., recorded seismic data).

In some examples, an interpolated 3D common shot gather can be generated "on the fly" (as survey data is processed) for each data trace, and the interpolated 3D common shot gather can be input into a general DWD technique according to some implementations. Performing 3D interpolation of data addresses sampling issues where an insufficient amount of samples of data are collected. An interpolated 3D common shot gather can refer to a common shot gather in which data at points in 3D space where survey receivers are absent can be estimated (interpolated) from actual measured survey data by the survey receivers. Additional details of techniques of computing an interpolated 3D common shot gather are discussed further below. The interpolated 3D common shot gather can be applied to 3D wavefield extrapolation through a 3D water layer model, to create receiver-side water-layer-multiple traces. These receiver-side traces are then subtracted from the data traces after a constrained adaptive match filtering operation to yield temporary data containing just primary, non-water-layer-multiples and source-side water-layer multiples. For example, the adaptive match filtering operation can use a least mean squares or least squares adaptive filtering algorithm, or some other type of adaptive match filtering algorithm. As an example, in least square adaptive filtering, within defined time and space windows, a convolutional filter is designed that matches a noise model to the data in a least squares sense. The match filtering can be constrained by a short length and maximum allowable coefficient amplitude. In some examples, the constrained adaptive match filtering can subtract some multiples but not other multiples, to avoid changing amplitude of multiples.

The temporary data is water-bottom muted (to remove reflections from the water bottom, e.g., 112 in FIG. 1) and, for each data trace, an interpolated 3D common receiver gather is generated "on the fly." An interpolated 3D common receiver gather can refer to a common receiver gather that includes survey data of a particular survey receiver in response to multiple shots from survey sources, including estimated survey sources at points in 3D space where survey sources are absent. At these points, source signals can be estimated (interpolated) from actual source signals of the survey sources. Next, 3D wavefield extrapolation is applied to the interpolated 3D common receiver gather through the 3D water layer model, to create just source-side water-layer-multiple traces.

Figure 2:
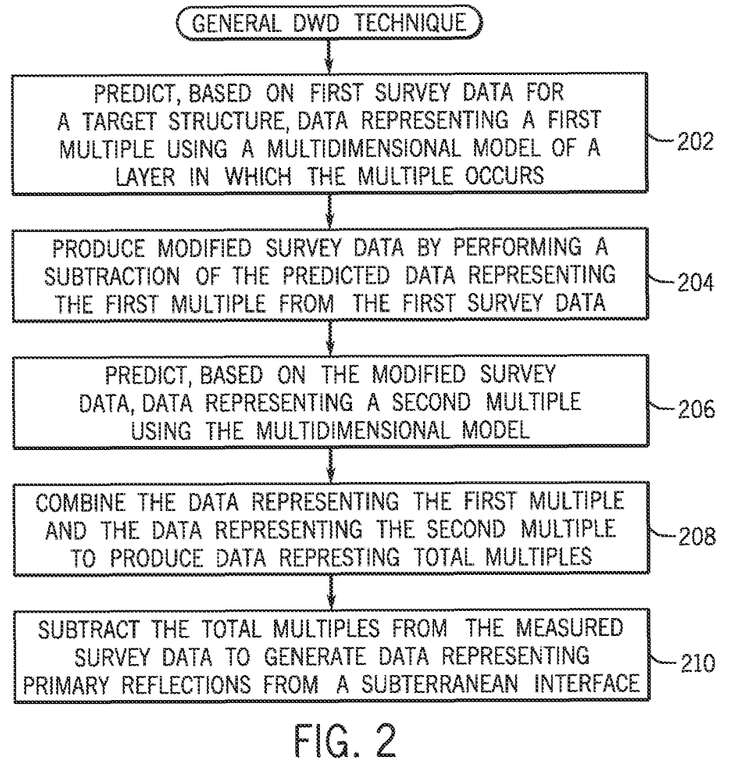
FIG. 2 is a flow diagram of a general DWD technique, according to some implementations.

FIG. 2 is a flow diagram of a general DWD technique, according to some examples. The general DWD technique predicts (at 202), based on first survey data (e.g., the interpolated 3D common shot gather discussed above) for a target structure (e.g., a subterranean structure), data representing a first multiple (e.g., receiver-side multiple) using a multidimensional model (e.g., 3D model or other multidimensional model) of a layer (e.g., water layer 106 in FIG. 1) in which the multiple occurs.

The general DWD technique produces (at 204) modified survey data (also referred to as temporary data) by performing a subtraction of the predicted data representing the first multiple from the first survey data. The subtraction can be an adaptive subtraction that uses adaptive match filtering, such as constrained adaptive match filtering (such as constrained adaptive match filtering described in U.S. Pat. No. 6,832,161). The modified survey data can also be produced based further on muting of water-bottom reflections (to remove reflections from the water bottom, e.g., 112 in FIG. 1). In addition, the modified survey data can be further based on application of 3D interpolation. For example, the modified survey data can be an interpolated 3D common receiver gather.

The general DWD technique next predicts (at 206), based on the modified survey data, data representing a second multiple (e.g., source-side multiple) using the multidimensional model.

Next, the general DWD technique can combine (at 208) the receiver-side multiple and source-side multiple, to produce data representing the total multiples (total multiples refer to a collection of both source-side and receiver-side multiples). The total multiples can then be adaptively subtracted (at 210) from measured survey data (survey data acquired by survey receivers 110 in FIG. 1 during a survey operation in response to energy from one or more survey sources 108) to generate data representing primary reflections from a subterranean interface. The data representing primary reflections refers to survey data without multiples, or with multiples attenuated.

In some implementations, the shot gather and receiver gather can be redatumed to the water surface before application of the general DWD technique. Redatuming the shot gather or receiver gather refers to estimating values of the shot gather or receiver gather at the water surface (e.g., 116) based on data measured at a depth below the water surface. The estimated values of the shot gather or receiver gather are values for an arrangement where survey sources or survey receivers are located at the water surface, rather than at some depth below the water surface. In other implementations, the redatuming can be omitted.

In some implementations, the 3D wavefield extrapolation through a 3D water layer model of a gather can be performed by 3D convolution of the gather with a Green's function. Note that reference to Green's function in this disclosure can refer also to a derivative of a Green's function (such as with respect to depth) or some other modified version of a Green's function. The Green's function for receiver-side wavefield extrapolation corresponds to the response at the water surface to an impulse injected into the water-layer model at the receiver position. Similarly, the Green's function for source-side wavefield extrapolation corresponds to the response at the water surface to an impulse injected into the water-layer model at the source position (assuming that measurement data has been redatumed as discussed above).

In an example, a Green's function may be derived using a wavefield extrapolation technique based on the acoustic or elastic wave equation. In another example, a ray-traced first arrival estimate of the Green's function can be used. In yet other examples, the data is not redatumed to the water surface; rather, Green's functions can be computed for the depth where the survey source(s) is (are) activated.

In further implementations, the 3D wavefield extrapolation through a 3D water layer model of a gather can be performed by wavefield redatuming to the water bottom (e.g., seafloor horizon or 112 in FIG. 1) followed by wavefield redatuming to the water surface (e.g., 116 in FIG. 1).

Figure 3:
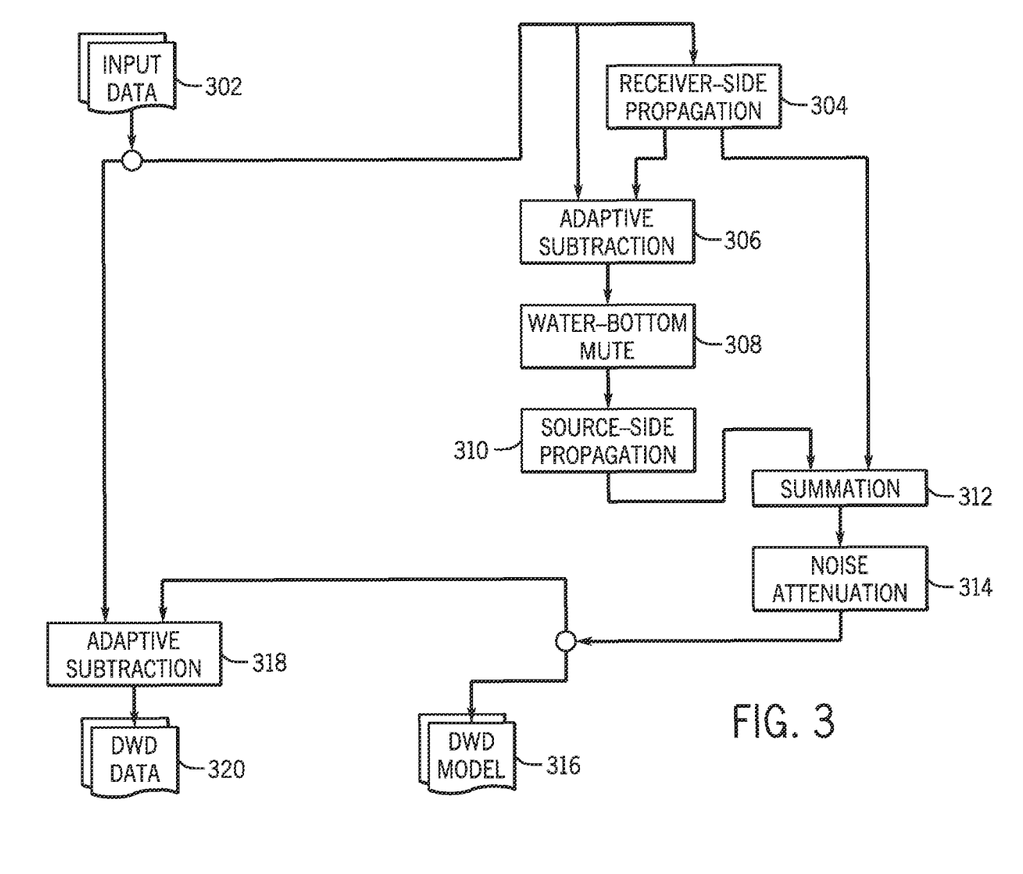
FIGS. 3-6 are flow diagrams of example general DWD techniques, according to various implementations.

FIG. 3 is a flow diagram of a general DWD technique according to further implementations. In FIG. 3, input data 302 is processed using the general DWD technique. Note that the input data 302 can include acquired survey data (as acquired by survey receivers) and an interpolated multidimensional common shot gather (such as the interpolated 3D common shot gather discussed above). The general DWD technique performs (at 304) receiver-side propagation to predict receiver-side multiples using the multidimensional model of the water layer. The receiver-side propagation (304) corresponds to task 202 in FIG. 2, where receiver-side multiples are predicted based on the interpolated multidimensional common shot gather using a multidimensional model of a layer (e.g., water layer 106 in FIG. 1) in which the multiples occur.

Next, the general DWD technique performs adaptive subtraction (at 306) (similar to task 204 of FIG. 2) by subtracting the predicted receiver-side multiples from the interpolated multidimensional shot gather. The adaptive subtraction (at 306) yields temporary data containing just primary, non-water-layer-multiples and source-side water-layer multiples.

The temporary data is water-bottom muted (at 308) to remove reflections from the water bottom (e.g., 112 in FIG. 1). In some examples, the water-bottom muting (at 308) can be omitted.

The general DWD technique then performs (at 310) source-side propagation, to predict, based on the temporary data, source-side multiples using the multidimensional model of the water layer. Task 310 corresponds to task 206 in FIG. 2.

The receiver-side multiples computed by task 304 are summed (at 312) with the source-side multiples computed by task 310, to produce data representing the total multiples. Task 312 corresponds to task 208 in FIG. 2.

Next, noise attenuation can be applied (at 314) to the data representing the total multiples, to attenuate noise. An example technique for noise attenuation includes a linear noise attenuation (LNA) technique. In other examples, other noise attenuation techniques can be used. In other examples, the noise attenuation task 314 can be omitted.

The output of task 314 (or of task 312) includes the data representing the total multiples. Such data can be stored as a DWD model 316, which is a model of multiples in the water layer computed by the general DWD technique according to some implementations.

The general DWD technique also performs adaptive subtraction (at 318) between measured survey data (302) and the data representing the total multiples (output of task 314 or 312), to produce DWD output data (320). Task 318 corresponds to task 210 in FIG. 2. The DWD output data (320) includes data representing primary reflections from a subterranean structure.

In further examples, upgoing/downgoing (U/D) separation can be applied to the input survey data prior to application of a general DWD technique. The U/D separation separates the input survey data into upgoing wavefield data (containing wavefields that have at least a portion propagating in the upward direction) and downgoing wavefield data (containing wavefields that have at least a portion propagating in the downward direction). The general DWD technique can then be applied on the upgoing wavefield data, and the general DWD technique can separately be applied on the downgoing wavefield data.

The DWD models (316) produced from the separate applications of the general DWD technique to the upgoing wavefield data and the downgoing wavefield data can be combined, and the combined model (representing multiples) can be used to perform the adaptive subtraction (at 318) from the total wavefield data (the combined upgoing and downgoing wavefield data). In other examples, the DWD model (316) produced based on application of the general DWD technique to the upgoing wavefield data can be subtracted from the upgoing wavefield data, and similarly, the DWD model (316) produced based on application of the general DWD technique to the downgoing wavefield data can be subtracted from the downgoing wavefield data.

By separating measured survey data into upgoing and downgoing wavefield data and applying processing separately, deghosting can be performed. Deghosting refers to removing a portion of the measurement data, as measured by survey receivers, due to reflections from the water surface (e.g., 116 in FIG. 1).

Figure 4:
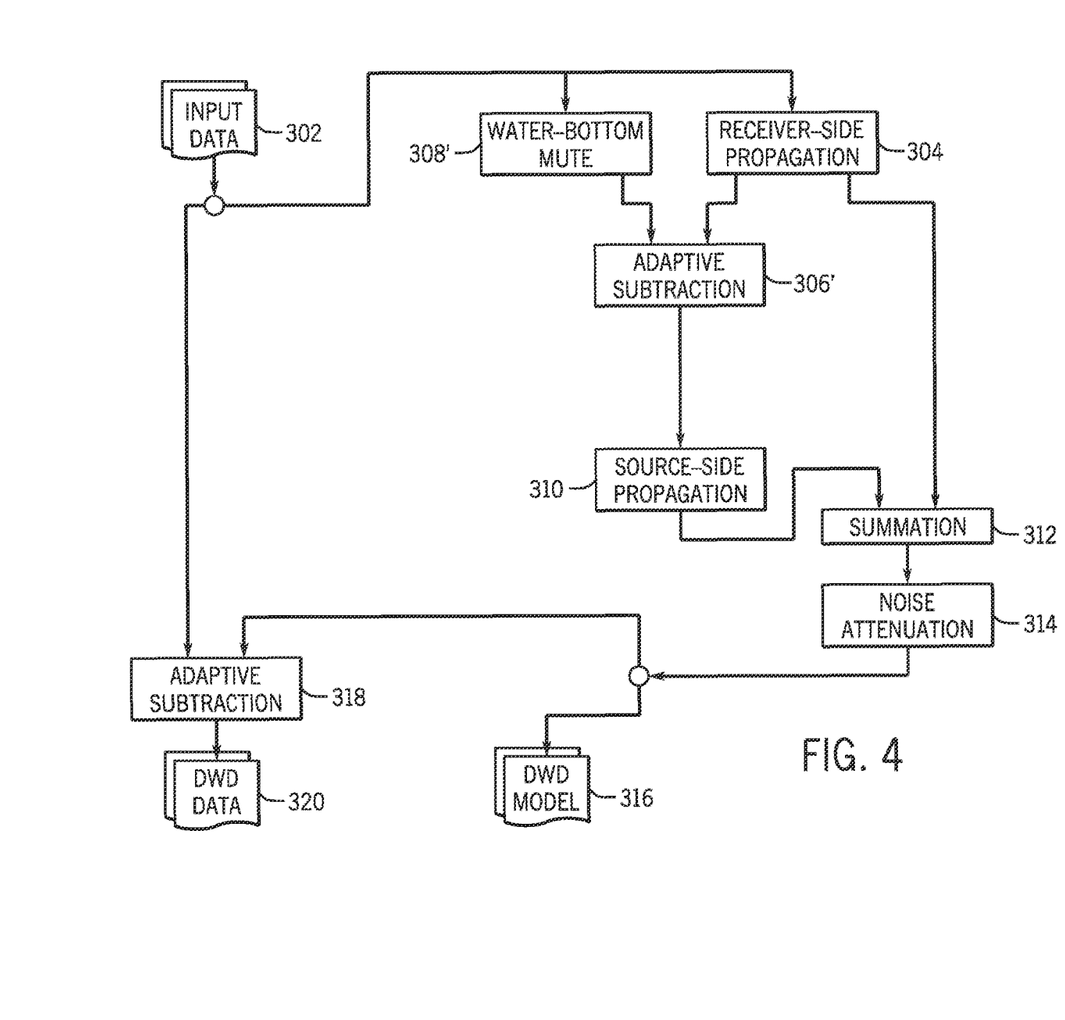

FIG. 4 is a flow diagram of a general DWD technique according to other implementations. The tasks of FIG. 4 are similar to the tasks of FIG. 3, except with a change in the order of some tasks. In FIG. 4, water-bottom muting is applied (at 308') to measured survey data, rather than to the output of the adaptive subtraction (306) as performed in FIG. 3. In FIG. 4, the adaptive subtraction (306') is performed between the water-bottom muted survey data and the source-side multiples.

As discussed above, an interpolated 3D common shot gather is generated on the fly from measured survey data, and provided as input into a general DWD technique, In some implementations, the interpolated 3D common shot gather can be generated by interpolating 3D gathers by use of a nearest neighbor search and kinematic correction technique. Similarly, an interpolated 3D common receiver gather can be generated by interpolating 3D gathers on the fly by use of a nearest neighbor search and kinematic correction technique.

A 3D interpolation process of a gather is performed as follows to produce an interpolated 3D areal gather (e.g., interpolated 3D common shot gather or common receiver gather), in some examples.

For a given target trace, the 3D interpolation process creates a pair of areal gathers with identical surface station footprints where one gather is a shot gather with source coordinates located at the source coordinates of the target trace, and the other gather is a receiver gather with receiver coordinates located at the receiver coordinates of the target trace. The surface station footprint is oriented to align with the survey source to survey receiver line of the target trace, and the spatial extent of the footprint is determined by user-specified aperture parameters.

Next, 3D convolution is performed by convolving together corresponding station traces from each gather, and summing the resulting convoluted traces.

In some examples, each pair of areal gathers as discussed above can be generated from a different specified dataset. This allows, for example, convolution of data with a primary estimate, which is a component of a surface-related multiple elimination (SRME) technique where results are iterated to overcome over-prediction of higher order multiples when both gathers contain multiple modes (mode that includes receiver-side multiples and mode that includes source-side multiples, as discussed above). Generating each pair of areal gathers from a different specified dataset also allows 3D convolution of data with other 3D operators, such as the Green's function used for wavefield extrapolation from the surface to the water bottom, or to the water bottom and back.

As discussed further above, wavefield extrapolation of data can be used for computing data containing multiples (receiver-side multiples or source-side multiples) based on a water-layer model, for example. Wavefield extrapolation can be performed using a Green's function.

In some implementations, a Green's function can be approximately derived by interpolating from a regular grid of synthetic 3D areal shot records generated by Wemmod modeling of data recorded from an impulsive source fired into the 3D water-layer model.

Some features of Wemmod can include the following:
1. 3D synthetic data is generated by wavefield extrapolation through an earth model.
2. The synthetic data can be output at any desired geometry.
3. The earth model can be a water-layer model.
4. The source wavefield can be an impulse, with the output then approximating the Green's function.

Note that Wemmod modeling also can have the ability to wavefield extrapolate an injected wavefield (such as a 3D shot record) through the earth model.

Further details regarding an example of Wemmod modeling is provided in C. Stork et al., "Predicting and Removing Complex 3D Surface Multiples with WEM Modeling—An Alternative to 3D SRME for Wide Azimuth Surveys?" SEG Technical Program Expanded Abstracts 2006, pp. 2679-2683.

In some implementations, Green's functions can be generated on the fly rather than interpolated from stored records.

In some examples, to provide an amplitude error of a receiver-side predicted multiple to be within a small range, an estimate of the water bottom reflectivity can be derived and incorporated into an earth model before the application of a general DWD technique. In other examples, unity can be used as the reflectivity in the earth model, and the receiver-side multiple prediction model traces are then multiplied by the local reflectivity estimate before the constrained match-filtering.

Figure 5:
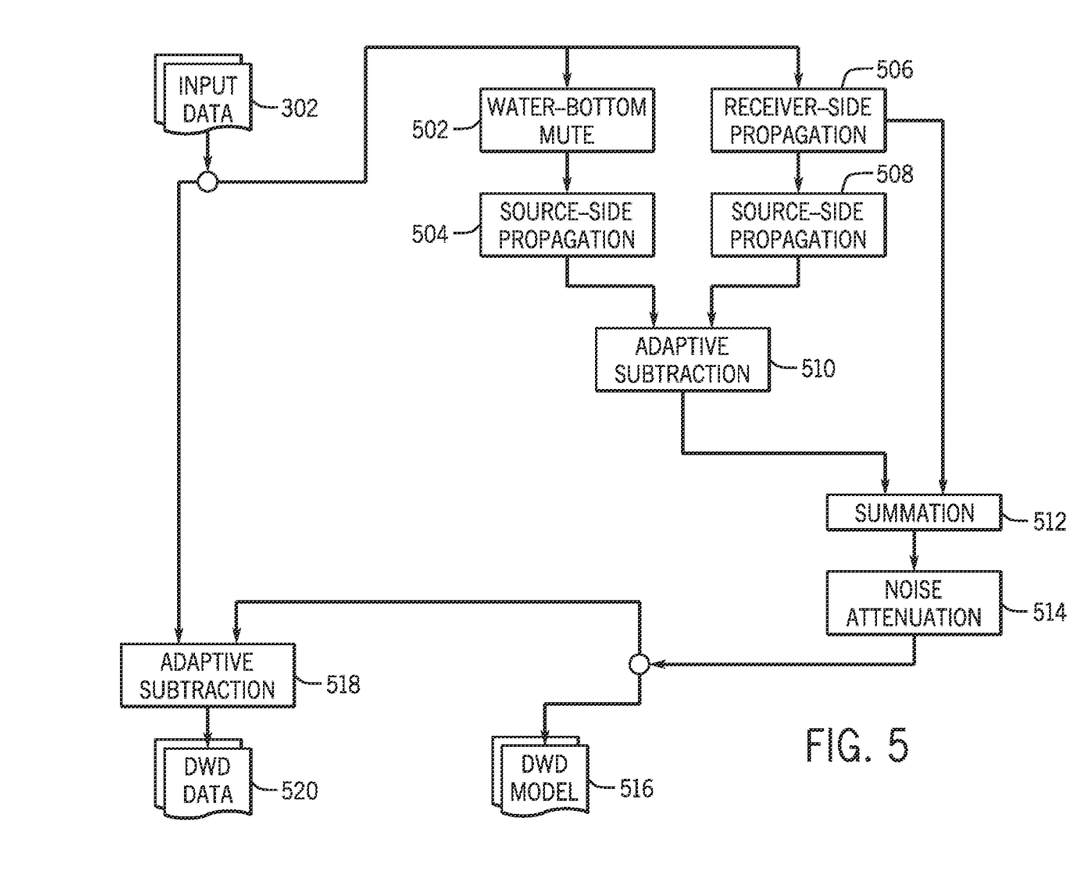

FIG. 5 is a flow diagram of a general DWD technique according to other implementations. Input data 302 (similar to input data 302 discussed above in connection with FIG. 3) is input into the general DWD technique of FIG. 5. The input data 302 is first subjected to water-bottom muting (at 502). A source-side propagation is then applied (at 504) on the water-bottom muted data to predict, based on the input data 302, source-side multiples using a multidimensional model of the water layer.

A receiver-side propagation is also applied (at 506) to the input data 302 to predict receiver-side multiples using the multidimensional model of the water layer. A source-side propagation is then applied (at 508) to output data produced by the receiver-side propagation. The source-side propagation (508) is effectively a source-side propagation of receiver-side propagated data. The source-side propagation (508) predicts, based on the data representing the receiver-side multiples produced by the receiver-side propagation (506), data representing a correction to the data representing the source-side multiples.

Adaptive subtraction is then applied (at 510) to the output data produced by the source-side propagation (504) and the output data produced by the source-side propagation (508). The adaptive subtraction produces a corrected version of the data representing the source-side multiples.

The receiver-side multiples computed by the receiver-side propagation (506) are summed (at 512) with the source-side multiples computed by task 510, to produce data representing the total multiples. Next, noise attenuation can be applied (at 514) to the data representing the total multiples, to attenuate noise. In other examples, the noise attenuation task (514) can be omitted.

The output of task 514 (or of task 512) includes the data representing the total multiples. Such data can be stored as a DWD model 516, which is a model of multiples in the water layer computed by the general DWD technique according to some implementations.

The general DWD technique also performs adaptive subtraction (at 518) to subtract, from input measured survey data (302), the data representing the total multiples (output of task 514 or 512), to produce DWD output data (520). The DWD output data (520) includes data representing primary reflections from a subterranean structure.

Figure 6:
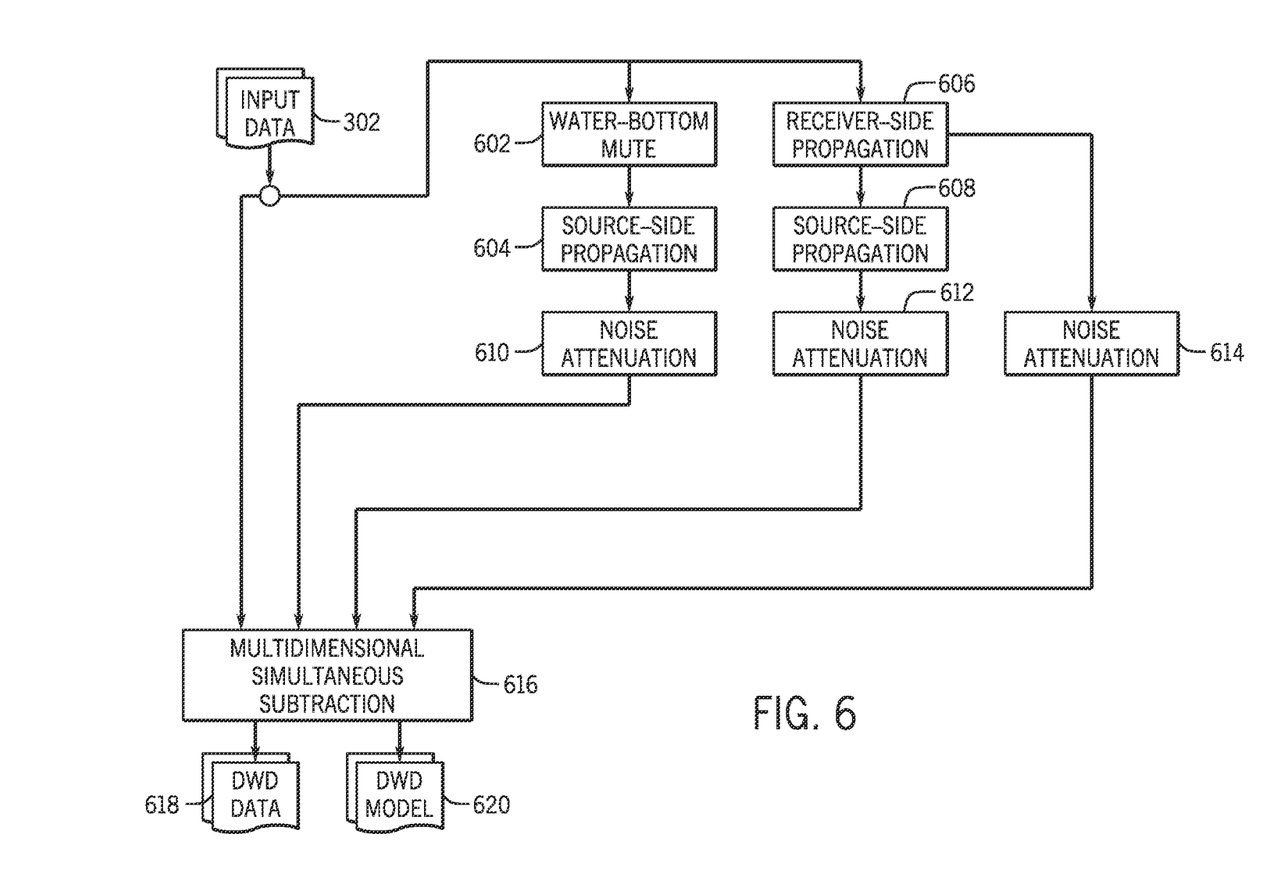

FIG. 6 is a flow diagram of a general DWD technique according to yet further implementations. Input data 302 (similar to input data 302 discussed above in connection with FIG. 3) is input into the general DWD technique of FIG. 6. The input data 302 is first subjected to water-bottom muting (at 602). A source-side propagation is then applied (at 604) on the water-bottom muted data to predict, based on the input data 302, source-side multiples using a multidimensional model of the water layer. The source-side propagation (604) can involve multidimensional interpolation of the input data 302 that uses a nearest neighbor search and kinematic correction technique as discussed above.

A receiver-side propagation is also applied (at 606) to the input data 302 to predict receiver-side multiples using the multidimensional model of the water layer. A source-side propagation is then applied (at 608) to output data produced by the receiver-side propagation. The source-side propagation (608) is effectively a source-side propagation of receiver-side propagated data. Each of the receiver-side propagation (606) and source-side propagation (608) can involve multidimensional interpolation of respective input data that uses a nearest neighbor search and kinematic correction technique as discussed above.

Next, noise attenuation can be applied (at 610, 612, and 614) to, respectively, the outputs of the source-side propagation (604), the source-side propagation (608), and the receiver-side propagation (606). In other examples, the noise attenuation tasks (610, 612, and 614) can be omitted.

The general DWD technique of FIG. 6 can perform (at 616) simultaneous adaptive subtraction to subtract, from input measured survey data (302), output data of the source-side propagation (604 or 610, depending on whether the noise attenuation 610 is applied), output data of the source-side propagation (608 or 612, depending on whether the noise attenuation 612 is applied), and output data of the receiver-side propagation (606 or 614, depending on whether the noise attenuation 614 is applied), to produce DWD output data (618). The simultaneous adaptive subtraction can account for errors and sub-water bottom reflections. The simultaneous subtraction includes constraints on subtraction operators used in the simultaneous subtraction.

The idea here is that the operator for the correction can be related theoretically to the operators for the other terms. In other examples, other types of subtractions can be performed to subtract, from input measured survey data (302), output data of the source-side propagation (604 or 610), output data of the source-side propagation (608 or 612), and output data of the receiver-side propagation (606 or 614).

The DWD output data (618) includes data representing primary reflections from a subterranean structure. Data including total multiples (combination of both receiver-side multiples and source-side multiples) can also be derived and stored as a DWD model (620).

The following further describes the constrained simultaneous subtraction discussed above. Input measured data (302 in FIG. 6) is represented as Din, while the DWD output data (618) is represented as Dout. The source-side multiples produced by the source-side propagation (604) can be represented as S, the receiver-side multiples produced by the receiver-side propagation (606) can be represented as R, and the corrected data output by the source-side propagation (608) can be represented as SR.

Ideally, the DWD output data (618) can be derived as follows:

$$Dout=Din-(S+R-SR).$$

However, due to errors in models used for producing S, R, and SR, subtraction operators (also referred to as filters) can be included in the following equation for deriving Dout by performing a simultaneous adaptive subtraction:

$$Dout=Din-fS*S-fR*R-fSR*SR,$$

where fS, fR, and fSR are subtraction operators used in the simultaneous adaptive subtraction, and * denotes convolution.

It is expected that $fS\approx1$, $fR\approx1$, and $fSR\approx-1$. The constraints on the operators fS, fR, and fSR are provided to enforce the foregoing values of fS, fR, and fSR.

In some examples, there may be an overall amplitude or wavelet error in the models used to compute S, R, and SR, in which case the constraints can be provided to enforce the following: $fS\approx A$, $fR\approx A$ and $fSR\approx-A$, where A represents the error. In further examples, fS, fR and fSR can be computed simultaneously, but with constraints such as $fS\approx fR$ and $fSR\approx-fS*fR$.

More generally, the constraints on the operators for S and R are provided to set approximately equal operators fS and fR (operators having values to within a specified range or percentage of each other), and to set the operator fSR to be approximately a polarity-reversed version of the operators fS and fR.

Figure 7:
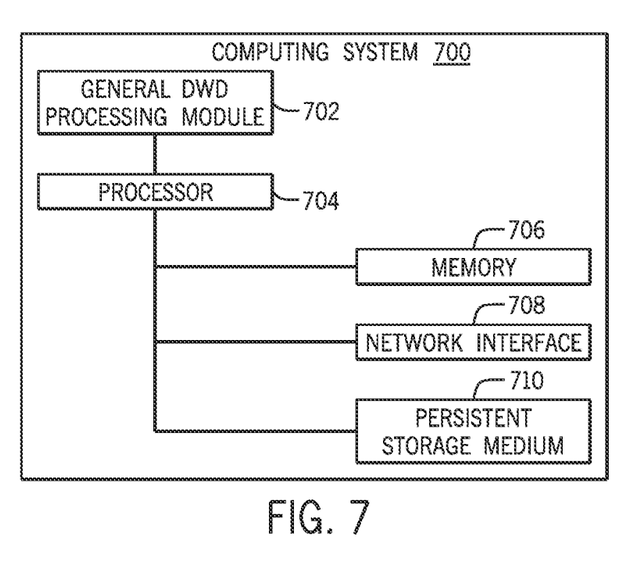
FIG. 7 is a block diagram of an example computing system in accordance with some implementations.

FIG. 7 is a block diagram of an example computing system 700. The computing system 700 includes a general DWD processing module 702, which can include machine-readable instructions executable on one or more processors 704 to perform any of the general DWD techniques discussed herein. The processor(s) 704 can be coupled to a memory 706, a network interface 708 (to allow the computing system 1000 to communicate over a data network), and a persistent storage medium 710.

The memory 706 or storage medium 710 can include any of various different forms of storage including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape;

optical media such as compact disks (CDs) or digital video disks (DVDs); or other types of storage devices. Note that the instructions discussed above can be provided on one computer-readable or machine-readable storage medium, or can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In general, according to some implementations, data representing a first multiple is predicted, based on first survey data for a target structure, using a multidimensional model of a layer in which the first multiple occurs. Modified survey data is produced by performing a subtraction of the predicted data representing the first multiple from the first survey data. Based on the modified survey data, data representing a second multiple is predicted using the multidimensional model.

In general, according to further or other implementations, the first multiple comprises a receiver-side multiple, and the second multiple comprises a source-side multiple.

In general, according to further or other implementations, the first survey data is generated by performing a multidimensional interpolation of measured survey data.

In general, according to further or other implementations, performing the multidimensional interpolation of measured survey data uses a nearest neighbor search and kinematic correction technique.

In general, according to further or other implementations, performing the multidimensional interpolation of measured survey data comprises producing a multidimensional common shot gather on the fly.

In general, according to further or other implementations, performing the subtraction comprises adaptively subtracting the predicted data representing the first multiple from the first survey data.

In general, according to further or other implementations, adaptively subtracting comprises applying a constrained adaptive match filtering.

In general, according to further or other implementations, predicting the data representing the first multiple comprises applying a multidimensional wavefield extrapolation on the first survey data, and predicting the data representing the second multiple comprises applying a multidimensional wavefield extrapolation on the modified survey data.

In general, according to further or other implementations, applying the multidimensional wavefield extrapolations comprises applying multidimensional convolutions of the corresponding first survey data and modified survey data In general, according to further or other implementations, the multidimensional convolutions are performed with respective Green's functions.

In general, according to further or other implementations, the Green's function for the multidimensional wavefield extrapolation on the first survey data corresponds to a response at a water surface to an impulse injected into the multidimensional model of the layer at a survey receiver position, and the Green's function for the multidimensional wavefield extrapolation on the modified survey data corresponds to a response at the water surface to an impulse injected into the multidimensional model of the layer at a survey source position.

In general, according to further or other implementations, the Green's function is estimated by interpolating from a grid of synthetic areal shot records.

In general, according to further or other implementations, producing the modified survey data further comprises muting water bottom reflections.

In general, according to further or other implementations, producing the modified survey data comprises performing a multidimensional interpolation of a result derived from the subtraction of the predicted data representing the first multiple from the first survey data.

In general, according to further or other implementations, the first survey data comprises a multidimensional common shot gather, and the modified survey data comprises a multidimensional common receiver gather.

In general, according to further or other implementations, the common shot gather and the common receiver gather are redatumed to a water surface.

In general, according to further or other implementations, the common shot gather and the common receiver gather are redatumed to a water bottom.

In general, according to further or other implementations, the data representing the first multiple and the data representing the second multiple are combined to produce total multiples, and deriving primary reflections in measured survey data using the total multiples.

In general, according to some implementations, a computing system includes at least one processor configured to predict, based on first survey data for a target structure, data representing a first multiple using a multidimensional model of a layer in which the first multiple occurs, produce modified survey data by performing a subtraction of the predicted data representing the first multiple from the first survey data, and predict, based on the modified survey data, data representing a second multiple using the multidimensional model.

In general, according to some implementations, a non-transitory computer-readable storage medium stores instructions that upon execution cause a system including a processor to predict, based on first survey data for a target structure with a water bottom reflection removed, data representing a first multiple using a multidimensional model of a layer in which the first multiple occurs, predict, based on input survey data for the target structure, data representing a second multiple using the multidimensional model, predict, based on the data representing the second multiple, data representing a correction to the data representing the first multiple using the multidimensional model, produce a corrected version of the data representing the first multiple by subtracting the data representing the correction to the data representing the first multiple from the data representing the first multiple, and subtract, from the input survey data, the corrected version of the data representing the first multiple, and the data representing the second multiple.

In general, according to further or other implementations, the instructions upon execution cause the system to further sum the data representing the data representing the second multiple and the corrected version of the data representing the first multiple, and wherein the subtracting subtracts, from the input survey data, an output of the summing.

In general, according to some implementations, data representing a first multiple is predicted based on first survey data for a target structure with a water bottom reflection removed using a multidimensional model of a layer in which the first multiple occurs. Performing the predicting employs a multidimensional interpolation of measured survey data using a nearest neighbor search and kinematic correction technique. Based on input survey data for the target structure, data representing a second multiple using the multidimensional model is predicted. Based on the data representing the second multiple, data representing a correction to the data representing the first multiple using the multidimensional model is predicted. The data representing the first multiple, the data representing the second multiple, and the data representing the correction to the data representing the first multiple are simultaneously subtracting from the input survey data.

In general, according to further or other implementations, the simultaneous subtracting includes constraints on subtraction operators.

In general, according to further or other implementations, the constraints on the subtraction operators are provided to set subtraction operators for the first and second multiples, and to set a subtraction operator for the data representing the correction to approximately a polarity-reversed version of the subtraction operators for the first and second multiples.

In the foregoing description, numerous details are set forth to provide an understanding of the subject disclosed herein. However, implementations may be practiced without at least some of these details. Other implementations may include modifications and variations from the details discussed above. It is intended that the appended claims cover such modifications and variations.

What is claimed is:

1. A method executed by a computer system, comprising:
    applying, using a multidimensional model, a multidimensional wavefield extrapolation on a first survey data gather for a target physical structure, to predict data representing a first multiple, the multidimensional model being of a layer in which the first multiple occurs;
    producing modified survey data by performing a subtraction of the predicted data representing the first multiple from the first survey data gather;
    applying, using the multidimensional model, a multidimensional wavefield extrapolation on a second survey data gather generated from the modified survey data, to predict data representing a second multiple, wherein the first survey data gather is one of a common shot gather and a common receiver gather, and the second survey data gather is a different one of the common shot gather and the common receiver gather;
    combining the first multiple and the second multiple to produce data representing total multiples; and
    subtracting the total multiples from the first survey data to produce survey data with the total multiples attenuated, the survey data with the total multiples attenuated representing reflections from the target physical structure.

2. The method of claim 1, wherein the first multiple comprises a receiver-side multiple, the first survey data gather comprises the common shot gather, the second multiple comprises a source-side multiple, and the second survey data gather comprises the common receiver gather.

3. The method of claim 1, further comprising generating the first survey data gather by performing a multidimensional interpolation of measured survey data.

4. The method of claim 3, wherein performing the multidimensional interpolation of the measured survey data uses a nearest neighbor search and kinematic correction technique.

5. The method of claim 3, wherein performing the multidimensional interpolation of the measured survey data comprises producing a multidimensional common shot gather on the fly.

6. The method of claim 1, wherein performing the subtraction of the predicted data representing the first multiple from the first survey data gather comprises adaptively subtracting the predicted data representing the first multiple from the first survey data gather.

7. The method of claim 6, wherein the adaptively subtracting comprises applying a constrained adaptive match filtering.

8. The method of claim 1, wherein applying the multidimensional wavefield extrapolation on the first survey data gather comprises applying a multidimensional convolution of the first survey data gather, and wherein applying the multidimensional extrapolation on the second survey data gather comprises applying a multidimensional convolution on the second survey data gather.

9. The method of claim 8, wherein the multidimensional convolutions are performed with respective Green's functions.

10. The method of claim 9, wherein the Green's function for the multidimensional wavefield extrapolation on the first survey data gather corresponds to a response at a water surface to an impulse injected into the multidimensional model of the layer at a survey receiver position, and the Green's function for the multidimensional wavefield extrapolation on the second survey data gather corresponds to a response at the water surface to an impulse injected into the multidimensional model of the layer at a survey source position.

11. The method of claim 9, further comprising estimating the Green's functions by interpolating from a grid of synthetic areal shot records.

12. The method of claim 1, wherein producing the modified survey data further comprises muting water bottom reflections.

13. The method of claim 1, wherein producing the modified survey data comprises performing a multidimensional interpolation of a result derived from the subtraction of the predicted data representing the first multiple from the first survey data gather.

14. The method of claim 1, further comprising redatuming the common shot gather and the common receiver gather to a water surface.

15. The method of claim 1, further comprising redatuming the common shot gather and the common receiver gather to a water bottom.

16. A computing system comprising:
    at least one processor; and
    a non-transitory storage medium storing instructions executable on the at least one processor to:
        apply, using a multidimensional model, a multidimensional wavefield extrapolation on a first survey data gather for a target physical structure, to predict data representing a first multiple, the multidimensional model being of a layer in which the first multiple occurs;
        produce modified survey data by performing a subtraction of the predicted data representing the first multiple from the first survey data gather;
        apply, using the multidimensional model, a multidimensional wavefield extrapolation on a second survey data gather generated from the modified survey data, to predict data representing a second multiple using the multidimensional model, wherein the first survey data gather is one of a common shot gather and a common receiver gather, and the second survey data gather is a different one of the common shot gather and the common receiver gather;

combine the first multiple and the second multiple to produce data representing total multiples; and subtract the total multiples from the first survey data to produce survey data with the total multiples attenuated, the survey data with the total multiples attenuated representing reflections from the target physical structure.

17. The computing system of claim 16, wherein the first multiple comprises a receiver-side multiple, the first survey data gather comprises the common shot gather, the second multiple comprises a source-side multiple, and the second survey data gather comprises the common receiver gather.

18. The computing system of claim 16, wherein the applying of the multidimensional wavefield extrapolation on the first survey data gather comprises applying a multidimensional convolution of the first survey data gather, and wherein the applying of the multidimensional extrapolation on the second survey data gather comprises applying a multidimensional convolution on the second survey data gather.

19. The computing system of claim 18, wherein the multidimensional convolutions are performed with respective Green's functions.

20. The computing system of claim 19, wherein the Green's function for the multidimensional wavefield extrapolation on the first survey data gather corresponds to a response at a water surface to an impulse injected into the multidimensional model of the layer at a survey receiver position, and the Green's function for the multidimensional wavefield extrapolation on the second survey data gather corresponds to a response at the water surface to an impulse injected into the multidimensional model of the layer at a survey source position.

* * * * *